US012691787B2

(12) United States Patent
Sastinsky

(10) Patent No.: US 12,691,787 B2
(45) Date of Patent: **\*Jul. 28, 2026**

(54) POWER CELL TRACKING AND OPTIMIZATION SYSTEM

(71) Applicant: BatteryCheck s.r.o., Prague (CZ)

(72) Inventor: Michal Sastinsky, Bratislava (SK)

(73) Assignee: BatteryCheck LLC, Lewes, DE (US)

( \* ) Notice: Subject to any disclaimer, the term of this patent is extended or adjusted under 35 U.S.C. 154(b) by 171 days.

This patent is subject to a terminal disclaimer.

(21) Appl. No.: 18/087,736

(22) Filed: Dec. 22, 2022

(65) Prior Publication Data

US 2023/0242009 A1 Aug. 3, 2023

Related U.S. Application Data

(63) Continuation of application No. 16/539,540, filed on Aug. 13, 2019, now Pat. No. 11,535,122.

(Continued)

(51) Int. Cl.
*H02J 7/00* (2026.01)
*B60L 58/16* (2019.01)
(Continued)

(52) U.S. Cl.
CPC ............ *B60L 58/16* (2019.02); *G05B 13/024* (2013.01); *G05B 13/0265* (2013.01);
(Continued)

(58) Field of Classification Search
CPC ....... G06F 9/451; G06F 16/27; G05B 13/024; G05B 13/0265; B60Y 2200/91;
(Continued)

(56) References Cited

U.S. PATENT DOCUMENTS 8,650,416 B2 2/2014 Noel
10,962,599 B2 3/2021 Petrucelli
(Continued)

FOREIGN PATENT DOCUMENTS

BR 102019022219 A2 5/2021
CN 105676139 6/2016
(Continued)

OTHER PUBLICATIONS

International Search Report and The Written Opinion of The International Searching Authority mailed Nov. 15, 2019, for related PCT Application No. PCT/US19/46388 filed Aug. 13, 2019, 10 pages.
(Continued)

*Primary Examiner* — Zixuan Zhou
(74) *Attorney, Agent, or Firm* — Mahamedi IP Law LLP

(57) ABSTRACT

A computing system can receive and compile power cell data, and in certain examples, the power cell data can be distributed to a distributed ledger. The computing system can further determine approximate battery end of life (ABEL) for each power cell based on a compiled historical record of power cell data. Based on the determined ABEL, the computing system can generate ABEL reports for users, determine optimal settings for a power cell or battery-powered device, and/or transmit notifications to users, to facilitate power cell usage optimization, and/or optimal repurposing or recycling timing.

20 Claims, 6 Drawing Sheets

Related U.S. Application Data

(60) Provisional application No. 62/718,878, filed on Aug. 14, 2018.

(51) Int. Cl.

| | |
|---|---|
| *G05B 13/02* | (2006.01) |
| *G06F 9/451* | (2018.01) |
| *G06F 16/27* | (2019.01) |
| *H01M 10/42* | (2006.01) |
| *H04L 67/125* | (2022.01) |
| *B60K 6/28* | (2007.10) |

(52) U.S. Cl.
CPC .............. *G06F 9/451* (2018.02); *G06F 16/27* (2019.01); *H01M 10/425* (2013.01); *H04L 67/125* (2013.01); *B60K 6/28* (2013.01); *B60Y 2200/91* (2013.01); *B60Y 2200/92* (2013.01); *H01M 2010/4271* (2013.01); *H01M 2220/20* (2013.01)

(58) Field of Classification Search
CPC ................ B60Y 2200/92; B60L 58/16; H01M 2010/4271; H01M 2220/20; H01M 10/425; H04L 67/125; B60K 6/28
USPC ............................................. 320/109; 701/22
See application file for complete search history.

(56) References Cited

U.S. PATENT DOCUMENTS

| | | | |
|---|---|---|---|
| 2012/0075107 A1 | 3/2012 | Newman et al. | |
| 2013/0085696 A1 | 4/2013 | Xu et al. | |
| 2014/0019001 A1* | 1/2014 | Nishizawa | B60L 58/16 |
| | | | 701/31.9 |
| 2017/0358041 A1 | 12/2017 | Forbes, Jr. et al. | |
| 2018/0143257 A1* | 5/2018 | Garcia | G01R 31/382 |
| 2019/0036178 A1 | 1/2019 | Karner | |
| 2019/0280496 A1 | 9/2019 | Kosugi et al. | |
| 2020/0055421 A1 | 2/2020 | Sastinsky | |
| 2020/0269722 A1 | 8/2020 | Aykol et al. | |
| 2022/0114373 A1 | 4/2022 | Westerheide et al. | |
| 2023/0126889 A1 | 4/2023 | Sastinsky | |

FOREIGN PATENT DOCUMENTS

| | | |
|---|---|---|
| CN | 112732443 A | 4/2021 |
| EP | 2790262 | 10/2014 |
| WO | WO-2016/040823 | 3/2016 |
| WO | WO-2020/036984 | 2/2020 |
| WO | WO-2023/014991 | 2/2023 |

OTHER PUBLICATIONS

Use Cases for Blockchain Technology in Energy & Commodity Trading; Jul. 31, 2017; 20 Pages. https://www.pwc.com/gx/en/industries/energy-utilities-resources/publications/blockchain-technology-in-energy.html.

Building a sustainable battery supply chain: Is blockchain the solution?; Jun. 27, 2018. 8 Pages. https://www.whitecase.com/publications/insight/building-sustainable-battery-supply-chain-blockchain-solution.

International Search Report and The Written Opinion of The International Searching Authority mailed Mar. 27, 2023, for related PCT Application No. PCT/US2022/039608 filed Aug. 5, 2022, 11 pages.

* cited by examiner

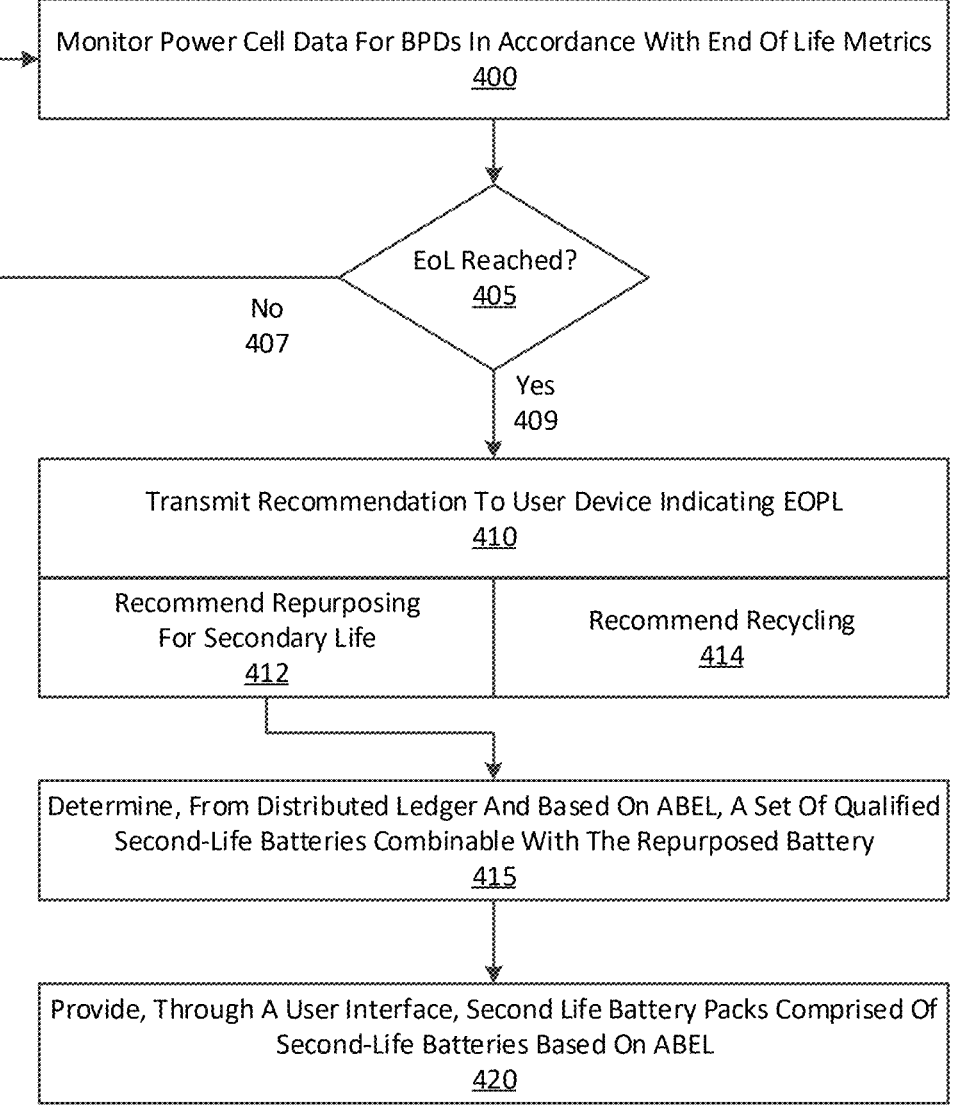

Monitor Power Cell Data For BPDs In Accordance With End Of Life Metrics
400

EoL Reached?
405

No
407

Yes
409

Transmit Recommendation To User Device Indicating EOPL
410

Recommend Repurposing For Secondary Life
412

Recommend Recycling
414

Determine, From Distributed Ledger And Based On ABEL, A Set Of Qualified Second-Life Batteries Combinable With The Repurposed Battery
415

Provide, Through A User Interface, Second Life Battery Packs Comprised Of Second-Life Batteries Based On ABEL
420

FIG. 4

POWER CELL TRACKING AND OPTIMIZATION SYSTEM

RELATED APPLICATIONS

This application is a continuation of U.S. patent application Ser. No. 16/539,540, filed on Aug. 13, 2019; which claims the benefit of priority to U.S. Provisional Application No. 62/718,878, filed on Aug. 14, 2018; the aforementioned applications being hereby incorporated by reference in their entireties for all purposes.

BACKGROUND

Examples described herein relate generally to power cell tracking and optimization systems for use in primary life power cells, second life power cells, and further applications of power cells (e.g., batteries and/or energy storage systems). Battery systems and battery-powered goods, such as electric vehicles, tools, sensors Internet of Things (IoT) devices, etc., are projected to experience significant growth in production and sales in the coming decades. For example, common forecasts for the lithium ion battery market predict growth of three to four times current production in the next decade. However, underutilization of battery potential is common.

For example, widespread inefficiencies exist in the full usage of battery life, resulting in common practice of disposing or recycling batteries when they still possess nearly 80% of their capacity. This approximate battery capacity coincides with what is commonly known as the end of the primary life of the battery, and recycling or disposal of these batteries at the end of their primary life can results in significant waste and environmental hazard.

A secondary market for so-called second life batteries or battery packs alleviates the harmful effects of premature disposal or recycling of primary life batteries. However, inefficiencies in each of primary life battery monitoring, primary battery life usage, end-of-life prediction, and the selection of second-life batteries for battery packs—as well as the unreliability of battery information for used batteries and battery products—have prevented the exploitation of the full potential of batteries.

BRIEF DESCRIPTION OF THE DRAWINGS

The disclosure herein is illustrated by way of example, and not by way of limitation, in the figures of the accompanying drawings in which like reference numerals refer to similar elements, and in which:

FIG. 4 is a flow chart describing an example method of monitoring power cell data in accordance with a set of end-of-life determination metrics and providing second-life repurposing or battery replacement recommendations, according to examples described herein;

DETAILED DESCRIPTION

Figure 1:
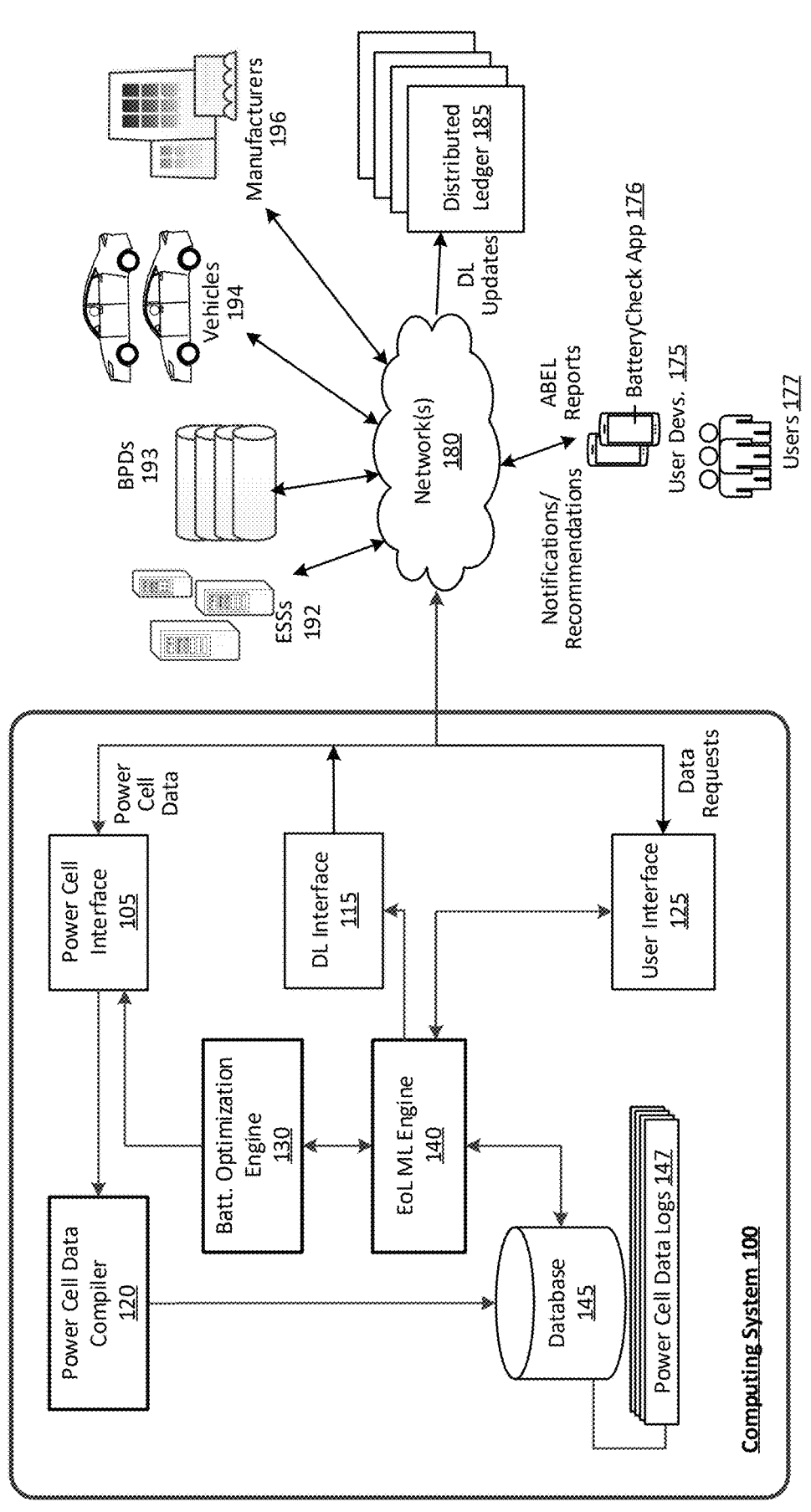
FIG. 1 is a block diagram illustrating computing system implementing power cell tracking and optimization, in accordance with examples described herein.

A power cell tracking and optimization system is described herein and provides a technical solution to the above-discussed problem in the field of power cell technology. The power cell tracking and optimization system can monitor and/or track power cell data from batteries, battery-powered devices, energy storage systems, etc. (e.g., of electric or hybrid automobiles). In various implementations, the system can include a database comprising data logs or profiles comprising battery information from each power cell or power cell type that the system monitors. According to examples provided herein, the power cell optimization system can receive battery data from the battery-powered devices periodically or dynamically and securely and permanently store the data in the data logs. In certain examples, the power cell optimization system can operate as an independent entity to various battery-powered product manufacturers to remain unbiased and trusted to product owners, potential battery product purchasers, manufacturers, and/or future battery purchasers.

In various implementations, the system can organize the battery data collected from each power cell, battery management system, or any other system that tracks, monitors, or manages power cells. For example, the system can collect or otherwise receive initial battery data from the nameplate or manufacturer of the power cell. For each power cell, these initial battery data can comprise information corresponding to the chemistry parameters of the power cell, the entity name of the producer, the type of battery cell chemistry, time of production (e.g., day, week, month, and/or year), charging and discharging temperatures, stated or estimated calendar life, estimated cycles, c-rate (e.g., a rate at which the battery is discharged relative to its maximum capacity), cell voltage (e.g., minimum and maximum voltages), energy density, depth of discharge, and any other available data from the power cell and power cell producer.

The system can further collect data provided from a producer and/or integrator that developed, tested, or otherwise installed the power cell into a power usage source (e.g., a vehicle or energy storage system). In addition to the above-mentioned data, these additional data can include nominal capacity of the power cell solution, usable capacity of the power cell solution, data about the setup of the battery management system (BMS) of the power cell (e.g., limitations on charging speed, discharging, etc.), general parameters about power cells and their performance for each particular battery chemistry (e.g., industry standards), and the like.

In certain aspects, the system can further collect time series data (e.g., atomic and/or aggregated data from the BMS of the power cell). For example, the system access data from the BMS of the power cell. These data can include current limits (e.g., minimum and maximum currents calculated by the BMS for charge and discharge directions), the current read from a direct current bus (e.g., current minimums, maximums, and averages), stack voltage of the power cell(s) (e.g., voltage minimums, maximums, and averages), cell voltage statistics (e.g., minimum, maximums, and average cell voltages of all power cells), cell voltage locations (e.g., cell number) for minimum and maximum measurements, temperature statistics (e.g., minimum, maximum, and average temperatures measured), temperature measurement locations (e.g., cell number for the minimum and maximum temperature measurements), contactor states, and the like. The system can further collect data corresponding to, for example, state of charge, state of discharge, state of health and/or other data that may be calculated by BMS. In certain implementations, the system can further collect data indicating BMS safety (e.g., a Boolean indicator indicating whether the BMS is safe or not). For example, the contactors of the power cell can automatically open if the BMS is determined to be unsafe. In addition, the system can further collect fault data of each power cell or the BMS (e.g., a bit field of BMS faults for identification).

In certain examples, the power cell optimization system can collect information corresponding to the deployment of the power cell(s), such as the parametric information relating to the use of the power cell (e.g., distance traveled in a respective electric vehicle, based on odometer reading), as well as the type of application which the power cell was (or is to be) used for (e.g., electric vehicle, battery electric vehicle, hybrid electric vehicle, electric bus, electric water-craft, electric airplane, electric scooter, train, forklift, energy storage systems, home storage, battery-powered sensor, industrial storage, photovoltaic connected, grid connected storage, power station, mobile phone, mobile device, IoT device, power tool, drone, and the like). In some aspects, the system can further collect data indicating the battery mode (e.g., island mode), frequency regulation, and/or time shift of a given power cell.

The data can be accessed or otherwise received using a controller area network (CAN) communication protocol, ModBus communication protocol (like ModBus TCP or any other) or any other communication protocol. In variations, the data can be accessed or received over one or more networks using any type of communications protocol (e.g., wireless or wired networks). For example, the power cell optimization system described herein can operate as a modular device in communication with the BMS of a power cell stack (e.g., mounted on-board the vehicle), or a remote power cell optimization system that receives data over network communications. In certain aspects, the power cell tracking and optimization system can receive the power cell data from vehicle manufacturers and/or the power cell manufacturers (e.g., producers of electric vehicles and batteries/energy storage systems). It is contemplated that the battery-powered product manufacturers and power cell manufacturers may collect and store power cell data for their manufactured products and battery systems. In this case, the power cell tracking and optimization system can connect to the data storage systems (e.g., cloud servers or central databases) of the manufacturers or trusted third-party storage service providers to acquire the power cell data.

In other examples, the power cell optimization system can comprise a distributed computing environment (e.g., block-chain or other distributed ledger technology) including remote and local computing systems that work together to independently collect and store battery data in a collectively guaranteed, reliable, secure, and robust manner (e.g., to determine second life information for the battery, which can be utilized for a variety of battery optimizations).

The power cell tracking and optimization system can include continuous and permanent recording, storage, and analyses of the above-mentioned data. According to examples described herein, the data can be transferred to central data storage, a combined central storage and distributed ledger, or a distributed ledger or blockchain (e.g., private blockchain, public blockchain, centralized blockchain, decentralized blockchain, hybrid public/private blockchain, and the like) to ensure safe and reliable storage. Additionally or alternatively, the power cell optimization system can analyze the data to determine a set of second life battery parameters indicating the usable capacity of the battery, number of cycles used, number of remaining cycles, and an approximate battery end life (ABEL) (e.g., an amount of time or remaining cycles left in the battery). For example, the determination of the approximate battery end life can be utilized as a starting point for second life battery usage.

In further implementations, the power cell optimization system can determine effective combinations of various batteries with different chemistries and generate a second life battery report indicating ideal combinations, which can be used by second life battery users to assemble and/or develop second life energy storage systems. For example, the power cell optimization system can categorize power cells based on ABEL calculations such that power cells with the same or similar ABELs can be assembled together in energy storage systems or battery stacks such that each power cell is utilized to its fullest potential.

In various examples, the data analysis and reporting can be implemented through machine learning, deep learning, statistical techniques, other forms of data analytics, neural network techniques, and/or artificial intelligence techniques to provide an accurate status of each primary life or second life power cell and to continually increase the accuracy and robustness of such determinations. In certain aspects, the power cell optimization system can collect data from new batteries (e.g., new batteries installed in electric vehicles, battery powered devices and energy storage systems), such that a full historical record of each power cell can be compiled. The power cell optimization system can be implemented through internet of things (IoT) technology to record, transfer, and store battery-related data from battery management systems, sensors, or other battery-powered devices and products in a guaranteed secure storage mechanism. For example, the power cell optimization system can utilize distributed ledger technology to ensure that the data are consistent and unalterable. As such, the data logs for each power cell can include unique identifiers indicating the source of the data (e.g., which data from which battery were collected) and time-stamps indicating when the data were collected. In addition, the data logs can include the ABEL of the power cell, which can be determined periodically (e.g., after each iteration of data collection) or dynamically (e.g., for continuous data collection implementations).

According to some examples, the power cell optimization system can provide the ABEL of each power cell to requesting users (e.g., an owner or operator of a vehicle), or second life power cell assemblers or entities using the ABEL reports to assemble second life battery solutions, scenarios, energy storage systems, etc. from used batteries. In some examples, the ABEL reports can be accessed through a web interface or via a designated application executing on computing devices of the users.

In further implementations, the power cell tracking and optimization system described herein can operate as a direct communication service for monitoring battery conditions, performance, capacity, etc., and provide battery-powered device servicers or technicians with usage recommendations (e.g., to replace a battery, to adjust charging technique, or suggest recycling) along with contextual information regarding the history of the battery (e.g., from a full report of the battery, which is stored in the distributed ledger). In various examples, the battery-powered devices can communicate directly with the power cell tracking and management system, providing updated information regarding the battery metrics described herein (e.g., current charge, number of total charging cycles, ambient temperature, internal temperature, and the like).

The power cell tracking and optimization system can store this updated information on the distributed ledger, compare the updated information with previous data corresponding to the battery-powered device, determine one or more recommendations for an owner, operator, or technician of the battery-powered device, and provide the recommendation(s) accordingly (e.g., through an application program notification on a computing device of the owner, operator, or technician). As provided herein, these recommendations can be provided to decrease a degradation rate of the battery, and optimize the power output, operating conditions, performance, and ultimately the ABEL of the batteries that run the battery-powered device.

Among other benefits, examples described herein achieve a technical effect of optimizing power cell usage through power cell data analytics and/or machine learning techniques to determine reliable and accurate power cell usage recommendations and end-of-life for power cells, while increasing the accuracy and reliability of such determinations. In various implementations, examples described herein can leverage the advantages of distributed ledger technology to ensure robustness and immutability of data logs.

As provided herein, a "calendar life" of a power cell comprises the amount of time a power cell will last when used within normal boundaries. Such calendar life may also be referred to as nameplate calendar life, which is chemistry specific. For example, Lithium Titanate Oxide batteries have a calendar life of fifteen to twenty years, whereas Lithium Graphite NMC batteries have a calendar life of ten to twelve years.

Numerous examples described herein refer to a "power cell," which comprises any combination of batteries, battery packs, battery cells, electrochemical devices, ultracapacitors, fuel cells, solar cells (e.g., photovoltaic cells, solar water heaters, thermogalvanic cells, solar air heaters, solar thermal collectors, etc.), battery racks or battery strings, battery modules, battery containers, and other energy storage and/or deployment systems and other energy producing systems (e.g., piezoelectric sensors or devices, energy harvesting devices, crystals, etc.).

As further provided herein, "end-of-life," "real end-of-life," or "real end life" refers to the state of charge and/or state of health of a power cell being at zero percent. For primary life batteries, common practice is deemed that between 60%-80% of capacity equals the end of the primary life or simply end-of-life of the power cell. A "second life battery" comprise a power cell that has reached its primary end of life (e.g., 80% capacity for vehicle batteries and batteries/energy storage systems), but still has usable capacity for secondary use. The "approximated battery end of life" (ABEL) of a second life battery, refers to an estimated or calculated time between the primary end of life and the real end-of-life, and is the focus of the present disclosure.

As used herein, "distributed ledger" or "distributed ledger technology" refers to replicated, shared, and/or synchronized data spread across multiple sites. In certain aspects, the distributed ledger can comprise a central storage combined with independent remote storage resources. In variations, the distributed ledger can comprise a peer-to-peer network of storage devices, where each device replicates and stores an identical copy of the ledger (e.g., power cell logs) and updates independently. Examples of distributed ledgers can include a blockchain, various types of acyclic graphs (e.g., blockDAG or TDAG), and the like.

As used herein, a computing device refers to devices corresponding to servers, desktop computers, cellular devices or smartphones, personal digital assistants (PDAs), laptop computers, virtual reality (VR) or augmented reality (AR) headsets, tablet devices, etc., that can provide network connectivity and processing resources for communicating with the system over a network. A computing device can also correspond to custom hardware, in-vehicle devices, or on-board computers, such as those provided in connection with battery management systems of vehicles, energy storage systems, and the like. The computing device can also operate a designated application configured to communicate with a network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular phones or smartphones, personal digital assistants (e.g., PDAs), laptop computers, VR or AR devices, network equipment (e.g., routers), and/or tablet computers. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, flash memory (such as carried on smartphones, multifunctional devices, or tablets), and/or magnetic memory. Computers, terminals, network-enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example computing system 100 implementing power cell tracking and optimization, according to various examples. The computing system 100 can include a power cell interface 105 that receives power cell data from the battery management systems of any one or more of various sources, such as energy storage systems 192, vehicles 194, battery manufacturers 196, or any other solution which uses a battery/power cell as a primary or secondary source of electric energy.". Each power cell, battery stack, or energy storage system 192 can be managed by a battery management system which monitors batteries (e.g., voltage, temperature, current, etc.) and provide and calculate useful data about the status of the batteries (e.g., state of charge, state of health, etc.).

The battery management system can also control and manage charging and discharging of the power cells, influencing the battery performance and capacity during the life of the power cell, protecting the battery from degradation, and maintaining the battery within a certain set of safety parameters. While many examples provided with FIG. 1 and elsewhere in this application are described specifically in context of electrical vehicles 194, in variations, the examples described are applicable to other battery-powered devices 193 which utilize a battery/power cell as a primary or secondary source of electric energy (e.g., electric vehicle, battery electric vehicle, hybrid electric vehicle, electric bus, electric watercraft, electric airplane, satellites, scooter, train, forklift, energy storage systems, home storage, industrial storage, photovoltaic connected storage, grid connected storage, power station, mobile phone, mobile device, IoT device (s), power tool, drone, leaf blower, and the like).

As secondary batteries are used in a variety of manners, there are varying requirements for battery management systems, and battery management system topology depends what hardware and software components are used for the power cells, and can be based on the final energy storage solution and its targeted use. In various implementations, the power cell interface 105 can communicate with communication resources providing access to battery management systems of power cells (e.g., as implemented on vehicles 194, energy storage systems 192, battery-powered devices 193, power stations, or other solutions that use battery/power cell as a primary or secondary source of electric energy) to receive the power cell data. Examples as described may be applicable to monitoring power cells during first life, second life or any subsequent additional life.

As described herein, the power cell data can comprise nameplate information of the power cell, such as the chemistry parameters of the power cell, the entity name of the producer, the type of battery cell chemistry, time of production, temperature tolerances, stated or estimated calendar life, estimated cycles, c-rate, cell voltage ratings, energy density, depth of discharge, and any other available data from the power cell manufacturer 196. As further described herein, the power cell data can further include nominal capacity of the power cell solution (e.g., total capacity), usable capacity of the power cell solution (e.g., permitted capacity), data corresponding to the setup of the battery management system of the power cell solution (e.g., limitations on charging speed, discharging, etc.), general parameters about power cells and their performance for each particular battery chemistry (e.g., industry standards), and the like.

In certain aspects, the power cell data can further include time series data (e.g., atomic and/or aggregated data from the BMS of the power cell). such as current limits, the current read from a direct current bus, stack voltage of the power cell(s), cell voltage statistics, cell voltage locations, temperature statistics, temperature measurement locations, contactor states, and the like. The power cell data can further indicate a battery management system safety factor, and fault data of each power cell. In certain examples, the power cell data can further comprise information corresponding to the deployment of the power cell(s), such as the usage of the power cell, distance traveled (e.g., mileage from an odometer), and the end-user of the power cell (e.g., electric vehicle, battery electric vehicle, hybrid electric vehicle, electric bus, electric watercraft, electric airplane, scooter, train, forklift, mobile phone, mobile device, IoT device, power tool, drone, energy storage systems, home storage, industrial storage, photovoltaic connected, grid connected storage, power station, and the like). In some aspects, the power cell data can also indicate the battery mode (e.g., island mode), frequency regulation, and/or time shift.

In certain implementations, the power cell interface 105 can receive additional data from the battery-powered devices 193 and/or vehicles 194. For example, the power cell interface 105 can receive or otherwise assess sensor data from vehicle sensors or sensors from a battery powered device, such as diagnostic or telemetry sensors, an inertial measurement unit, positioning system, battery and/or energy storage system, and the like. Such data may also originate from the vehicle's on-board computers or memory, and can identify any faults, service requirements, current operability, and the like. In such examples, the computing system 100 can perform additional calculations with different results than ABEL, such as where power cell data is not needed as a primary or necessary source of data. For example, a vehicle manufacturer may provide data from other sensors of their vehicles, enabling the computing system 100 to calculate failures of certain spare parts or vehicle systems, and/or calculate predictive maintenance for additional components of the vehicle 194.

The power cell data can be accessed by the power cell interface 105 using a controller area network (CAN) communication protocol, ModBus communication protocol (like ModBus TCP), or any other communication protocol (e.g., leveraging JavaScript Object Notation (JSON) or any other communication means). In variations, the power cell data can be accessed or received by the power cell interface 105 over one or more networks 180 using any type of communications protocol (e.g., wireless or wired networks).

In various examples, the computing system 100 can include a power cell data compiler 120 which can organize and store the power cell data into data logs 147 of a database 145. In some aspects, the database 145 can comprise a central storage facility for the data logs 147 (e.g., big data storage). In certain examples, the power cell data compiler 120 can associate each power cell with a unique identifier (e.g., a vehicle identification number of a vehicle in which the power cell is installed). In variations, the data compiler 120 can associate each energy storage system 192, battery-powered device 193, vehicle 194, battery string, battery stack, or other end usage object in which more than one power cell is packaged, with a single unique identifier for managing the power cell data received from the power cells in the data logs 147.

In various aspects, the computing system 100 can further include a distributed ledger interface 115 that transmits the compiled power cell data and or the data logs 147 for each power cell or power cell package to a distributed ledger 185 (e.g., a blockchain) to ensure that the data and/or data logs 147 are secure and completely reliable. As provided herein, the distributed ledger 185 can comprise a peer-to-peer network of nodes or computing systems executing one or more consensus computer models or algorithms to ensure that the data logs 147 are replicated across the nodes.

According to examples described herein, the computing system 100 can further include an end-of-life (EoL) machine learning engine 140, which can execute one or more machine learning models to determine ABELs for power cells, and to continuously improve the accuracy of these calculations. It is contemplated that the EoL machine learning engine 140 can determine an ABEL for each power cell or power cell package (e.g., of a vehicle 194) based on the historical power cell data recorded in the data logs 147 by the data compiler 120. For example, each iteration of data collection by the power cell data compiler 120 can trigger the EoL machine learning engine 140 to determine a new or updated ABEL for a given power cell of an ESS 192, battery-powered device 193, electric vehicle 194, and the like. As another example, the EoL machine learning model 140 can be triggered to determine an ABEL of a particular power cell or energy storage system 192 upon request from a user 177 or other entity that uses, views or processes output of the computing system 100.

The EoL machine learning engine 140 can determine ABELs for a particular power cell given the current data in the data log 147 of that power cell. As described, these data may be organized using a unique identifier for the power cell and timestamps indicating when the data were collected. Accordingly, the EoL machine learning engine 140 can determine an ABEL for a battery given the entire historical record of the battery. The EoL machine learning engine 140 can also access or receive, as learning input, new power cell data periodically or dynamically received from the battery management systems, communication or processing interface, and/or IoT chips of the usage sources (e.g., energy storage systems 192, battery-powered devices 193, electric vehicles 194, power stations, etc.). The EoL machine learning engine 140 can utilize any newly received data to confirm or adjust previous ABEL calculations for a given power cell in order to continuously improve such calculations.

The EoL machine learning engine 140 can comprise computational resources executing a set of machine learning models or algorithms having a goal of accurate and reliable ABEL determinations. Such ABEL determination can be utilized by primary and or secondary power cell markets to promote the full usage of power cell capacity and significantly reducing and/or eventually eliminating waste. In providing accurate, unmanipulated and immutable ABEL reports to users 177—such as prospective used vehicle owners, current vehicle 194 owners, second life battery assemblers, prospective used battery-powered device buyers, current owners of battery-powered devices 193, or other entities that may otherwise use, view or process the output of the computing system 100—the computing system 100 and distributed ledger 185 offers a technical solution to various technical problems existing in the field of secondary power cell use.

The ABEL reports provided by the EoL machine learning engine 140 can comprise ABEL calculations or determinations for individual power cells, which can be identified by their unique identifiers. The ABEL reports can further include additional data, such as a battery state of health certificate (see FIG. 5B), which, in certain implementations, can comprise a ratio of the current rating of a battery with respect to nameplate rating as indicated by the battery's manufacturer 196, and/or a battery health grade indicating the current rating along with a guaranteed certificate of reliability. For example, when the state of health for a battery or battery-powered device 193 is 100% or "A+," the battery is performing in accordance with its nameplate rating. As another example, when the state of health for a battery or battery-powered device 193 is within 95% of its nameplate rating, the battery health grade can indicate an "A" rating.

For vehicle and battery-powered device implementations, the ABEL report generated by the EoL machine learning engine 140 can include ABEL determinations for every power cell in the vehicle 194 or battery-powered device 193, or a collective ABEL for the entire battery pack of the vehicle 194 or battery-powered device 193. The ABEL report of a vehicle 194 or battery-powered device 193 can further include information indicating a current age of the battery system, a number of charge/discharge cycles of the vehicle's battery system, and estimated number of charge/discharge cycles left, an estimated calendar life remaining for the battery system, the current mileage of the vehicle 194 or hourly usage of a battery-powered device 193, and the like. Along these lines, the ABEL report for any power cell can also include a current age of the power cell, a number of charge/discharge cycles of the power cell, an estimated number of charge/discharge cycles left, an estimated calendar life remaining for the power cell, a performance grade for the power cell, and the like. It is contemplated that such reports can be utilized to more accurately determine a current valuation of a vehicle 194 or battery-powered device 193 for both current owners and prospective buyer and largely eliminate the current need for speculative valuation.

In certain implementations, the users 177 can access ABEL reports through computing devices 175. For example, the ABEL reports can be accessed via a website or through a battery-check application 176 executing on the user's computing device 175 (e.g., via an application programming interface (API)). In certain examples, the user 177 can do so by entering a unique identifier of the power cell, or a vehicle identification number of the user's vehicle 194. In some implementations, the user 177 can access ABEL reports of power cells through a web portal, API, or other accessing means to connect with the computing system 100.

In further examples, the user interface 125, distributed ledger interface 115, and/or power cell interface 105 can correspond to a single API or multiple APIs that enable communications with the computing system 100. Accordingly, the communications systems of the ESSs 192, BPDs 193, vehicles 194, manufacturers 196 (e.g., of individual power cells, power cell packs or strings, the vehicles 194, ESSs 192, BPDs 193), trusted third-party services (not shown), distributed ledger 185, and/or the user devices 195 can transmit and/or receive data with the computing system 100 through an API of the computing system 100. Such data can include notifications and recommendations for enhancing battery performance, the power cell data, recommendations to repurpose or replace a power cell or power cell package, or ABEL requests and transmissions of ABEL reports, as described herein.

In examples, a user 177 can comprise any individual or entity that can receive information that is based on, or otherwise corresponds to, the ABEL of any power cell, or to any other type of report that can utilize an output of the system 100. For example, the user 177 can comprise a used vehicle 194 or used battery-powered device 193 buyer interested in the remaining life of the batteries in an electric or hybrid vehicle 194 or a used battery-powered device 193. In further examples, the user 177 can represent a current owner of battery-powered device 193 or electric vehicle 194, and can utilize the ABEL report to properly price the used vehicle 194 or battery-powered device 193 for resale. In still further examples, the user 177 can represent a second life energy storage system entity that assembles second life energy storage systems 192 from used power cells (e.g., from vehicles 194 in which the primary end-of-life of the vehicles' batteries has been met). In still further examples, the user 177 can comprise a bank entity, leasing entity, vehicle or battery-powered device dealership, business entities requiring fleets of vehicles, rental car and rental truck entities, on-demand electric scooter rental companies, parking structure operators, and the like. In some variations, the ABEL reports can be generated to provide these entities with information that facilitates the construction, configuration, or reuse of battery packs or energy storage systems 192 comprising individual second (third, or more) life power cells that have the same or similar ABELs. Such energy storage systems 192 can be composed of various power cells or batteries of varying chemistries.

In various implementations, the computing system 100 can include a battery optimization engine 130, which can communicate over the power cell interface 105 with vehicle manufacturers, battery-powered device manufacturers, and/or power cell manufacturers (collectively "manufacturers 196") and/or battery management systems, IoT chips, or other communication or processing interfaces of energy storage systems 192, battery-powered devices 194, and vehicles 194 (or any other managed battery or power cell device). The battery optimization engine 130 can analyze the power cell data and determine an optimal set of settings of the batteries that power the various devices 193 or vehicles 194 (e.g., the optimal settings for battery management systems of the vehicles 194 and/or energy storage systems 192) in order to increase or otherwise improve ABEL. For example, the battery optimization engine 130 can push certain data and/or commands back to, for example, the battery management systems of the power cells for reconfiguration, or to other manufacturer or third-party systems that can manage such power cells.

In doing so, the battery optimization engine 130 can determine, based on the power cell data, whether power cells are being used optimally. Certain settings may be changed by the battery optimization engine 130 in order to, for example, prolong the life of a battery, reduce the probability of damage to the battery, and the like. In one example, the battery optimization engine 130 can receive additional third-party contextual data, like weather or outdoor/ambient temperature information, traffic information, schedule information of a user 177 (e.g., via synchronization with a scheduling application on the user's computing device 175), location information from a positioning system of the computing device 175 or vehicle 194, and the like. The battery optimization engine 130 can reconfigure the battery management systems of vehicles 194, battery powered devices 193, and/or energy storage systems 192 to make the power cells run, deploy power, and/or recharge most optimally or efficiently given the current contextual conditions. For example, if a vehicle 194 operating in hot weather, the battery optimization engine 130 can cause the battery management system of the vehicle to be reconfigured for the hot weather (e.g., no fast charging permitted).

In certain examples, the battery optimization engine 130 can also act as a warning, notification, and or recommendation system. The ABEL of a given power cell can be calculated periodically by the EoL machine learning engine 140. Based, at least in part, on these calculations, the battery optimization engine 130 can determine optimal battery settings for the power cell's battery management system, and can generate and transmit notifications and/or recommendations to the computing device 175 of a user 177 of the vehicle 194, battery-powered device 193, or energy storage system 192. Such notifications or recommendations can identify certain actions or practices for users 177 that, if followed, would maximize the ABEL of their power cell (e.g., vehicle battery life). As an example, the battery optimization engine 130 can transmit a notification to the user 177 (e.g., a push notification from the executing battery-check app 176, an email, text message, etc.), which can suggest a certain action be performed.

For example, the notification can comprise a suggestion to habitually charge a vehicle's battery or battery-powered device's battery to 75%, as this can comprise an ideal state of charge for the user's vehicle 194 or battery-powered device 193 as determined from the historical ABELs calculated and usage data stored in the data log 147 of the vehicle 194 or battery-powered device 193. As another example, the battery optimization engine 130 can identify that the user 177 has not used a vehicle 194 or battery-powered device 193 for an extended period of time, and can transmit a recommendation to the computing device 175 indicating that minimal suggested usage of the vehicle 194 or battery-powered device 193 is at least one hour per week to minimize battery degradation. As another example, based on upcoming weather conditions indicating hot weather (e.g., as determined from a third-party weather forecasting resource) and the user's schedule indicating an upcoming vacation, the battery optimization engine 130 can transmit a notification suggesting that the user 177 store the vehicle indoors at a specified charge (e.g., 80%) during the period of hot weather.

In still further examples, the battery optimization engine 140 can monitor the power cell data in the power cell data logs 147 (e.g., stored centrally and/or on the distributed ledger 185) and/or through direct communications with the IoT chips or other communication mechanisms of battery-powered devices 193. For IoT implementations, the IoT chips can include a communication interface (e.g., Wi-Fi, Bluetooth to a central communications hub, etc.), and can be included on nearly any device requiring or capable of including computational resources. These devices can include virtually any battery powered device 193, such as sensor devices, construction equipment (e.g., power tools), electric scooters, home appliances, robotic devices (e.g., warehouse robots), office equipment, etc. According to examples described herein, the battery optimization system 130 can monitor the battery usage, conditions, current rating (e.g., compared to original nameplate rating), etc., in accordance with a set of optimal performance metrics. Such optimal performance metrics can be battery-type specific, battery-chemistry specific, battery-powered device specific, location specific (e.g., given average temperatures or weather conditions), time-specific (e.g., given current temperature or weather conditions, or current season), or any combination of the foregoing.

In various implementations, each battery or battery-powered device can be operable in a set of optimal performance ranges that can correspond to the deployment of power, charging, charging times, nature of usage, storage, and the like. The battery optimization engine 130 can identify when a particular battery or battery-powered device 193 operates or is otherwise used outside these set of optimal performance ranges. In response to this determination, the battery optimization system 130 can transmit a recommendation to the computing device 175 of the user 177 (e.g., via the battery-check app 176) indicating a set of suggestions that would result in a more optimal use of the batteries of the battery powered device 193 (e.g., prolong the ABEL and/or increase range, life, or performance of the battery-powered device 193).

It is contemplated that the recommendations triggered by a particular power cell or BPD 192 operating outside optimal ranges can be applied to both rechargeable power cells and single use power cells. Furthermore, the techniques described herein with regard to the recommendations for operational settings and/or adjustments, as well as replacement or repurposing recommendations can further be applied to direct-power sources, such as solar panels, solar cells, piezoelectric devices, and the like.

In certain examples, instead of sending recommendations, the battery optimization engine 130 can transmit a set of commands directly to the IoT chip or other communication device of the battery-powered device 193 to cause a management system of the BPD 193 to adjust one or more settings corresponding to charging, power deployment, cooling, heating, etc., in order to operate the battery within the set of optimal performance ranges (e.g., for the purpose of maximizing ABEL).

At times, the battery optimization system 130 may determine that certain batteries or battery powered-devices 193 are reaching or have reached their approximate end-of-life. For example, after providing recommendations to users 177 and/or control commands directly to the devices 193 to maximize ABEL, at some point the batteries of the device 193 will reach its actual end-of-life (e.g., which can fluctuate based on the battery's usage or device on which the batteries are implemented). At this point or just prior to this point, the battery optimization engine 130 can transmit a recommendation to the user device 175 of the owner to either repurpose or sell the battery for secondary use (e.g., for rechargeable batteries) or recycle and replace the battery (e.g., for single use batteries).

It is contemplated that the recommendations and/or direct adjustment controls implemented by the battery optimization engine 130 can by particular useful in certain applications where safety and/or convenience and efficiency are paramount. One particular application of the battery optimization engine 130 is for parking structure operators where each, or nearly each, parking space is monitored by a sensor device (e.g., a proximity sensor that detects whether a vehicle is parked in its dedicated space). Vehicles or drivers entering such structure are provided with information at each entrance or each floor of the structure, which indicates how many available spaces currently exist on that floor (e.g., in shopping malls, airports, sporting venues, etc.). Each parking sensor can include a sensor, one or more batteries, and a computer chip (e.g., in IoT chip) that includes a wireless transmitter or transceiver. A portion of the data periodically transmitted by the parking sensor can comprise charge information for the one or more batteries of the parking sensor.

The data from each parking sensor can be transmitted to a central hub (e.g., a local database) or a cloud storage resource which the power cell interface 105 can access to compile current power cell data for each parking sensor. As described herein, each parking sensor can be associated with a unique identifier and the power cell data compiler 120 can store the data with the unique identifier in the power cell data logs 147 and/or on the distributed ledger 185. The battery optimization engine 130 can periodically access the data for each parking sensor. Additionally, the EoL ML engine 140 can periodically calculate the ABEL for each battery of each parking sensor.

When the ABEL for any particular parking sensor crosses a certain threshold (e.g., within 5% of end-of life), the battery optimization engine 130 can transmit a recommendation to an operator of the parking structure (e.g., to a computing device 175 of the operator via the battery-check app 176) indicating the specific parking sensor. The operator may then find the specific parking sensor and change the battery or replace the sensor with a fully charged sensor. It is contemplated that this remote monitoring can preempt scenarios in which parking sensors run out of battery power and inaccurate parking information is provided to patrons of the parking structure, reducing efficiency and potentially impacting business.

In various additional examples, the ABEL reports can facilitate secondary battery-powered device markets by virtually eliminating fraud and promoting accurate and reliable valuations of battery-powered devices 193 (e.g., electric scooters) and vehicles 194 (e.g., electric airplanes or cars) for resale on both the owner side and the prospective buyer side. Furthermore, by providing end-of-life notifications and/or recommendations to replace, sell, or recycle batteries, examples described herein seek to foster circular economy by prolonging effective utilization of all raw materials used in the manufacturing of batteries until the chemical and/or physical properties of the batteries no longer allow for further usable capacity.

Methodology

Figure 2:
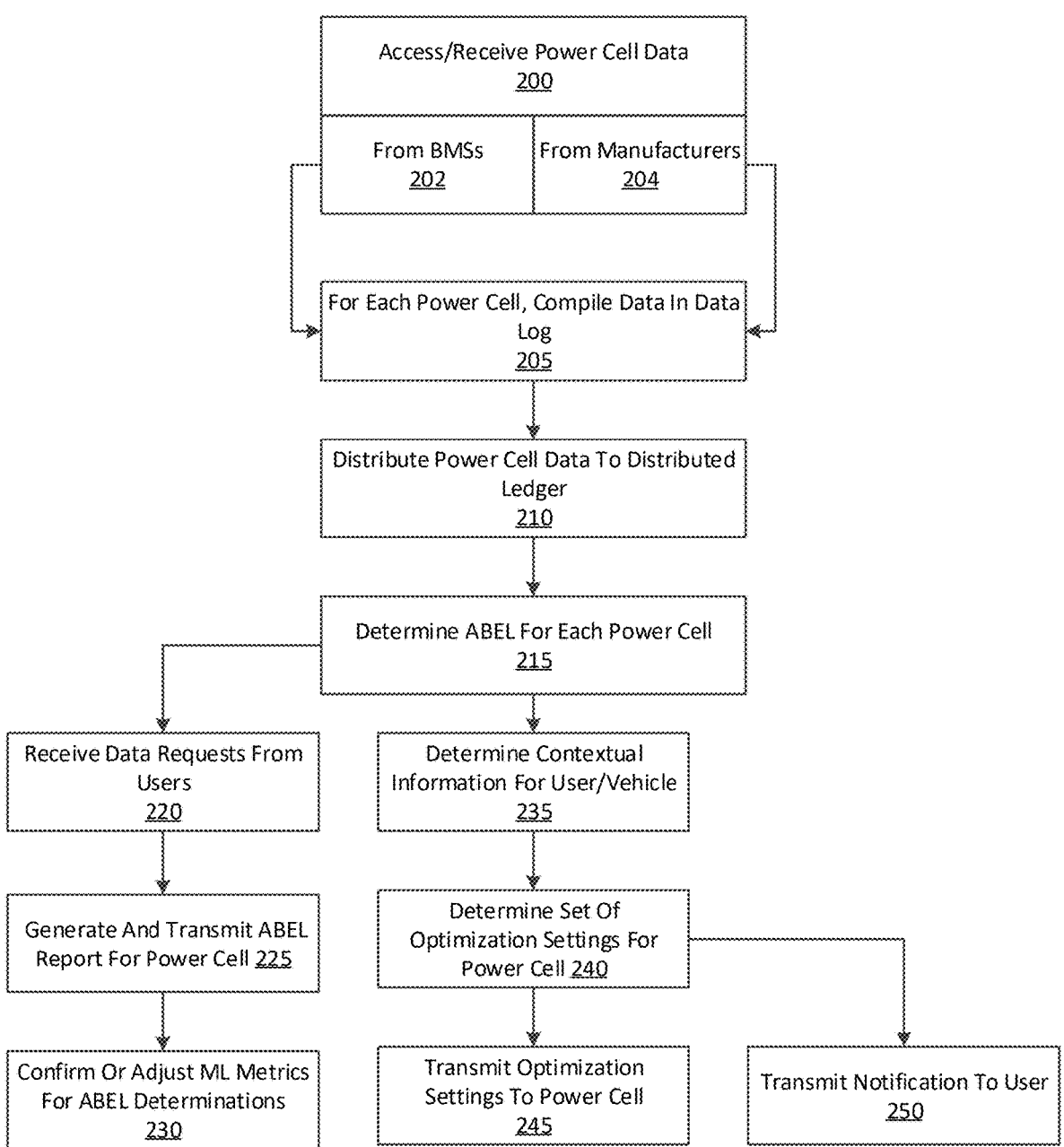
FIG. 2 is a flow chart describing an example method of power cell tracking and optimization, according to various examples.

FIG. 2 is a flow chart describing an example method of power cell optimization, according to various examples. In the below description of FIG. 2, reference may be made to reference characters representing various features shown and described with respect to FIG. 1. Furthermore, the method described with respect to FIG. 2 may be performed by an example computing system 100 as shown and described in connection with FIG. 1. Referring to FIG. 2, the computing system 100 can access and/or receive power cell data of power cells (200). In certain implementations, the computing system 100 can receive the power cell data from the battery management systems of the power cells (202). In variations or in addition, the computing system 100 can receive the power cell data from the power and or vehicle manufacturers 196 (204). Such power cells may be used for any purpose, such as on-board electric or hybrid vehicles 194, energy storage systems 192, etc.

The power cell data can initially be obtained from the power cell and/or vehicle manufacturers 196 (e.g., nameplate data), and an initial data log 147 for the power cell can be generated by the computing system 100. For example, nameplate data for a new battery can be received from the manufacturer 196 of the battery and/or vehicle. The computing system 100 can generate a data log 147 for the new battery by assigning a unique identifier for the new battery, and creating a set of data files organized by way of timestamps. Thereafter, new power cell data received for the battery (e.g., from the battery's management system) can be organized by the computing system 100 in the battery's data log 147.

In various examples, the computing system 100 can compile power cell data in a data log 147 for each power cell (205). The computing system 100 can further distribute the power cell data and/or data logs 147 to a distributed ledger 185 (210). In some aspects, each node of the distributed ledger 185 can include a data compiler 120 and database 145 to store power cell data in data logs 147. In such aspects, no central authority exists in the power cell optimization system, but rather, the system can comprise a distributed architecture for data storage and security. In certain examples, the data log 147 for a given power cell can comprise metadata based on the accumulated power cell data received from power cell sources, where the metadata can indicate the optimate operational ranges for the power cell given the battery chemistry and/or implementation of the power cell in a particular battery-powered device. In further examples, additional data provided by the battery-powered devices can also be utilized to determine the ABEL, provide operational recommendations, and the like.

The computing system 100 can determine an ABEL for each power cell based on the historical power cell data for that power cell (215). The computing system 100 can determine the ABEL of a power cell at any given time. For example, the computing system 100 can update the calculated ABEL of a power cell periodically (e.g., once per week or once per month), or in response to a user request. As described herein, the ABEL can comprise an approximated battery end of life (e.g., when the battery will reach 0% capacity or charge) for rechargeable batteries and/or single use batteries, and can comprise a determined calendar life, a number of remaining cycles, a remaining capacity, a remaining state of health, and the like.

In some examples, the computing system 100 can receive data requests from users 177 or the API (220). For example, the users 177 can access the computing system 100 and ABEL reports for individual batteries through a lookup interface on a website or application or API. A battery or battery string or pack may be identified by unique identifier on the battery nameplate or via a vehicle identification or registration number of a vehicle 194 or storage system 192. In variations, the unique identifier can comprise a combination of a dedicated battery identification number provided by the computing system 100, a password, and the like. In response to a data request, the computing system 100 can generate and transmit an ABEL report for the requested power cell to the requesting user 177 (225). As described herein, the ABEL report can be generated based on the currently existing historical data for that power cell. It is contemplated that over time and with continuous learning and, the computing system 100 can generate increasingly robust and accurate ABEL reports for individual power cells, no matter the chemistry (e.g., as battery chemistry comprises an input in the ABEL determination). Thus, based on any new power cell data received, the computing system 100 can confirm or adjust machine learning metrics for ABEL determinations, making future ABEL calculations for second life power cells more robust (230).

In certain implementations, the computing system 100 can further determine contextual information for the user 177 and/or the user's vehicle 194 (235). As described herein, the contextual information can comprise weather data, location data indicating the user's current location, temperature data, calendar data indicating the user's schedule, and the like. In some aspects, these contextual data can be received by synchronizing with other applications of the user's computing device 175 (e.g., a calendar application, mapping and/or traffic application, travel application, GPS module, weather application, and the like), or accessing such information from third-party resources. Based on the contextual information, the computing system 100 can determine a set of optimization settings for the power cell (240) (e.g., of the user's vehicle 194 or energy storage system 192). Such optimization settings can comprise charging settings, discharge settings, maximum and/or minimum charge or capacity settings, power delivery settings, and the like. In certain implementations, the computing system 100 can transmit the set of optimization settings to the battery management system of the power cell for execution, or the battery-powered device itself (245). Additionally or alternatively, the computing system 100 can generate one or more notifications or recommendations for the user 177, and transmit the notification to the user 177 (e.g., either to an on-board computer of the vehicle 194 or to the user's computing device 175), as described herein.

Figure 3:
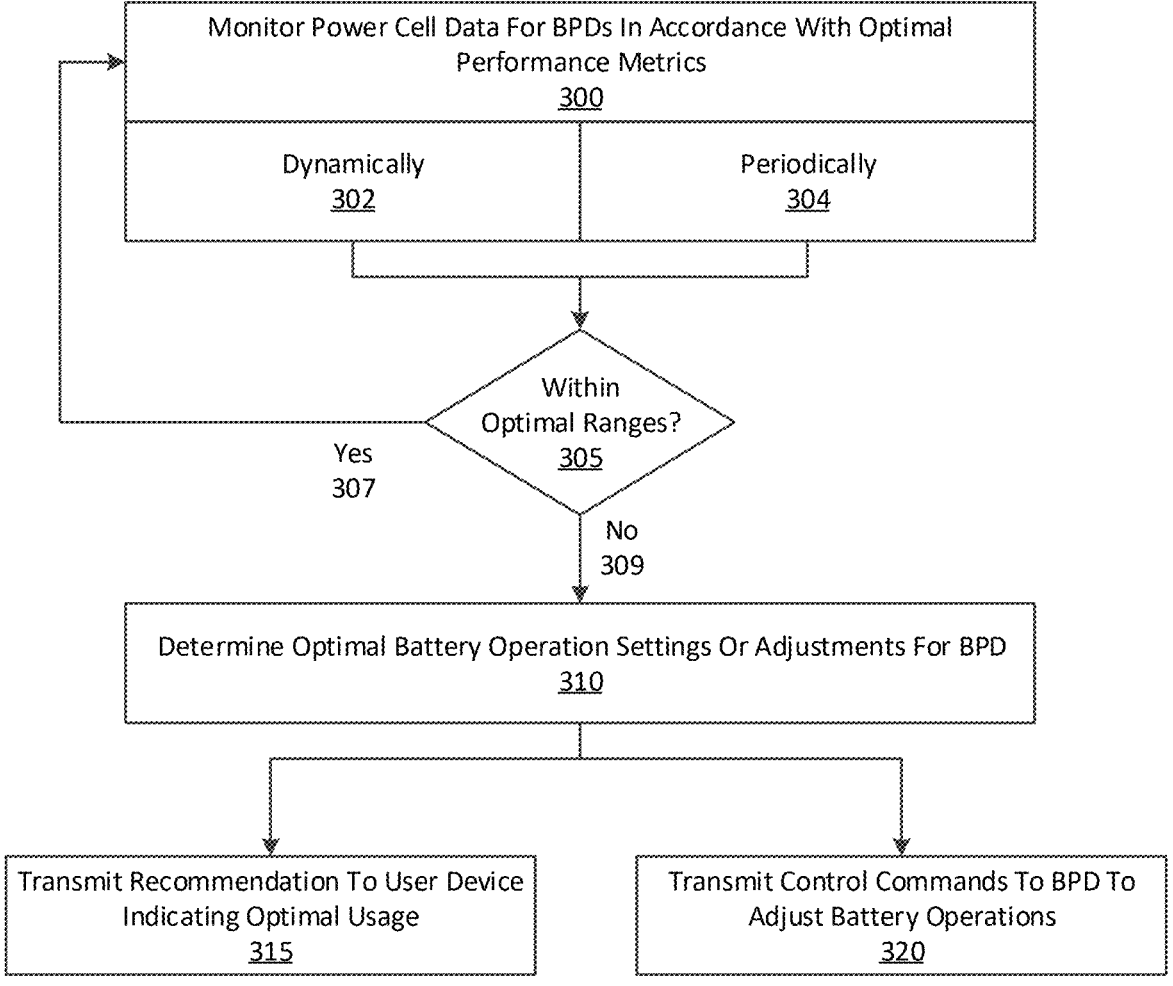
FIG. 3 is a flow chart describing an example method of monitoring power cell data in accordance with a set of optimization metrics and providing optimization recommendations and/or control commands to increase or maximize approximate battery end-of-life (ABEL) for batteries or battery-powered devices, according to example described herein.

FIG. 3 is a flow chart describing an example method of monitoring power cell data in accordance with a set of optimization metrics and providing optimization recommendations and/or control commands to increase or maximize approximate battery end-of-life (ABEL) for batteries or battery-powered devices, according to example described herein. In the below description of FIG. 3, reference may be made to reference characters representing various features shown and described with respect to FIG. 1. Furthermore, the method described with respect to FIG. 3 may also be performed by an example computing system 100 as shown and described in connection with FIG. 1.

Referring to FIG. 3, the computing system 100 can monitor power cell data for battery powered devices 193 in accordance with a set of optimal battery performance metrics (300). As provided herein, optimal performance metrics can be battery-type specific, battery-chemistry specific, battery-powered device specific, location specific (e.g., given average temperatures or weather conditions), time-specific (e.g., given current temperature or weather conditions, or current season), or any combination of the foregoing.

In various implementations, the computing system 100 can monitor the power cell data dynamically (e.g., in near-real time) (302), or directly from power cell data received from the battery-powered device 193 or a central hub through which the battery-powered device 193 communicates. As provided herein, the battery-powered devices 193 can include any product or vehicle 194 powered at least partially by one or more batteries. In variations, the computing system 100 can periodically access the power cell data from the distributed ledger to determine whether the various parameters of the battery are operating with the set of optimal battery performance metrics (304). The computing system 100 may then determine whether the batteries of the battery-powered device 193 is operating within optimal performance ranges corresponding to the set of optimal battery performance metrics (305). If so (307), the computing system 100 can continue monitoring the power cell data accordingly (300).

However, if not (309), then the computing system 100 can determine a set of optimal battery operation settings or adjustments for the battery-powered device 193 (310). These optimal battery operation settings or adjustments can correspond to charging habits (e.g., charging to no higher than 80% capacity), storage (e.g., indoors versus outdoors), nature of usage (e.g., high performance usage only at temperatures below 20° Celsius, capacity prior to charging (e.g., no lower than 5%), and the like. The computing system 100 may then transmit the recommendation(s) to the user device 175 of the user of the battery-powered device 193 to facilitate optimal usage and charging of the battery-power device 193 (e.g., to maximize ABEL) (315).

Additionally or alternatively, the computing system 100 can transmit control commands to the battery-powered device 193 in order to induce or adjust operations to within the optimal set of performance ranges (320). For example, the control commands can cause an IoT chip of a battery-powered device 193 to automatically disconnect from a charger (e.g., disengage a charge switch) when a certain charging capacity is reached (e.g., 93% capacity), and/or automatically connect to a charger when a depleted capacity is reached (e.g., 5% capacity) in order to facilitate in maximizing ABEL for the batteries of the device 193.

FIG. 4 is a flow chart describing an example method of monitoring power cell data in accordance with a set of end-of-life determination metrics and providing second-life repurposing or battery replacement recommendations, according to examples described herein. In the below description of FIG. 4, reference may be made to reference characters representing various features shown and described with respect to FIG. 1. Furthermore, the method described with respect to FIG. 4 may also be performed by an example computing system 400 as shown and described in connection with FIG. 1. Referring to FIG. 4, the computing system 100 can monitor power cell data for battery-powered devices 193 in accordance with a set of end-of-life metrics (400). For example, the computing system 100 can determine candidate batteries that are nearing their calculated ABEL.

In various implementations, the computing system 100 can determine whether a particular battery or package of batteries are at or near its end-of-life, end-of-primary life, or ABEL based on the power cell data (e.g., in the distributed ledger or directly from the battery) (405). If the battery has not reached its end-of-life (407), then the process can repeat to the next iteration of monitoring and end-of-life determination (400). However, if the computing system 100 determines that the battery has reached its end-of-life (e.g., the battery is within a certain threshold of its ABEL) (409), then the computing system 100 can transmit a recommendation to the user device 175 of a user 177 of the battery-powered device 193 indicating the end-of-primary-life of the battery (410).

In certain examples, the computing system can recommend recycling the batteries (e.g., for single use batteries) (414). In such examples, the computing system 100 can further provide the location or turn-by-turn directions to a battery recycling facility. In variations, the computing system 100 can recommend repurposing the battery for secondary life (e.g., for rechargeable batteries) (412). For example, the batteries of an electric vehicle 194 may reach their end-of-primary life at a certain time, as determined by the computing system's 100 ABEL calculations and monitoring. At this point, the charging time versus vehicle range may become inconvenient for the user 177. Along these lines, the computing system 100 can individually tailor the repurposing recommendation based on the user's routines (e.g., commuting distance), and transmit the repurposing recommendation at the appropriate time based on the user's 177 personal routines, usage habits, or preferences.

When the battery enters its usage as a second life battery, the computing system 100 classify it as such in the power cell data logs 147 (e.g., on the distributed ledger 185). Thus, any number of second life batteries may be available and listed on the distributed ledger 185 with guaranteed ratings and ABELs as determined by the computing system 100. In accordance with examples described herein, the computing system 100 can determine, from the distributed ledger 185 and based on the ABEL calculations, a set of qualified second life batteries that are combinable with the repurposed battery (e.g., having ABELs that are within a threshold range of the repurposed battery) (415). It is contemplated that such batteries can comprise batteries with the same or similar ABELs and/or the same or similar battery characteristics (e.g., same chemistry).

The computing system 100 can provide, through a user interface 125 (e.g., using API protocols), information corresponding to second life battery packs comprised of second-life batteries based on their respective ABELs (420). For example, individuals looking for a battery pack where space and/or weight is not a constraint (e.g., for peak-hour home use) can be provided with battery packs comprised of multiple batteries from different primary sources but having similar ABELs. It is contemplated that the creation of this secondary market for battery packs through a trusted source having highly accurate and reliable ABEL certifications (e.g., via use of the distributed ledger 185) can significantly reduce the cost of battery packs, eliminate uncertainty regarding used and repurposed batteries, maximize the utilization of batteries, and contribute significantly to existing and future environmental policies.

The techniques described throughout the present disclosure can be generalized for specific power cell types (e.g., lithium ion batteries), combinations of power cell type and operating conditions (e.g., lithium ion batteries used in vehicles or in a particular climate and/or season), and/or individualized based on user routines and usage habits. Thus, the optimal usage notifications and recommendations, ABEL reports, and repurposing or recycling notifications can be highly tailored based on any number of factors, including historical usage data (e.g., as indicated in the data logs 147 of the power cells), ambient temperatures, localized climate (e.g., hot and dry desert climate versus cool and humid climate), current temperature, atmospheric pressure, humidity conditions, manufacturer setting(s) (e.g., a manufacturer's recommendations for recycling or replacing batteries), user license agreement (ULA), warranty agreement, and the like. It is contemplated that the ABEL reports provided by the computing system 100 can supplement or replace such warranties and agreements through the big data analytics techniques described herein.

In various examples, the computing system 100 can further provide personalized recommendations to sell a particular power cell or battery-powered device. In such examples, the computing system 100 can monitor a secondary marketplace for power cells or battery-powered devices and can transmit a notification to an owner or user of a power cell or battery-powered device indicating the current sale or offer prices. For example, when the secondary market for a particular battery-powered product with a specific ABEL indicates a price premium that is a threshold value or percentage (e.g., ten percent) above a current valuation based on the ABEL of the battery-powered product, the computing system 100 can transmit a notification indicating the premium to a computing device of the user of the device. The user may then choose to sell the device for a profit. As another example, the computing system 100 can periodically provide the current market value of the same or similar battery-powered devices having the same or similar ABEL, and provide a comparison to a current valuation of the user's battery-powered device based on the ABEL of the device.

User Interface Examples

Figures 5A, 5B:
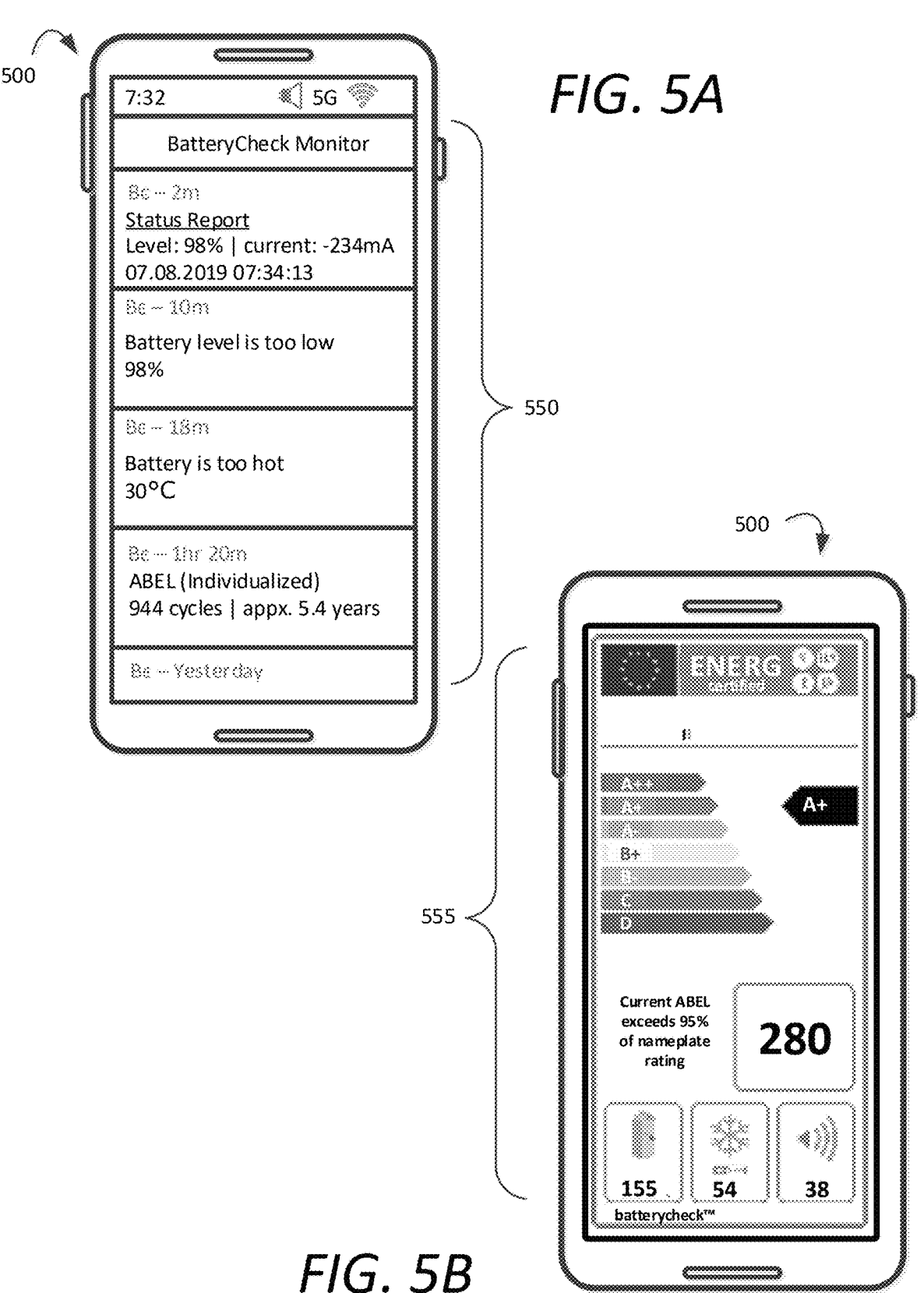
FIGS. 5A and 5B illustrate example user interfaces providing current battery state information (e.g., an ABEL report) and battery-check rating and certificate, according to examples described herein.

FIGS. 5A and 5B illustrate example user interfaces providing current battery state information and notifications (e.g., part of an ABEL report) and a battery-check rating and certificate interface, according to examples described herein. FIG. 5A shows a computing device 500 of a user, which can correspond to the user device 175 of the user 177 shown in FIG. 1. The computing device 500 displays an example user interface 550 of a portion of an ABEL report indicating the current battery state of a particular battery of a battery-powered device 193, and recent notifications provided through battery monitoring by the computing system 100 described in connection with FIG. 1. In certain aspects, the user can scroll through additional screens or interface panels to view the ABEL of the battery as determined by the computing system 100, and/or various recommendations for maximizing the ABEL of the battery.

FIG. 5B shows a computing device 500 of a user displaying a user interface screen 555 that provides a battery-check rating and certificate of the battery of the user's battery-powered device 193, including an ABEL indicator. It is contemplated that the certificate provides a guarantee as to the reliability of the battery rating, since the power cell data for the battery is stored on a distributed ledger 185 and the big data and data analytics techniques described herein provide for a highly accurate ABEL calculation. Thus, the rating and certificate shown in the user interface 555 of FIG. 5B can be viewed on-demand by a current owner (e.g., accessed through an API to the computing system 100 of FIG. 1), prospective buyer, second-life buyer, or original manufacturer of a battery-powered device 193.

Hardware Diagram

Figure 6:
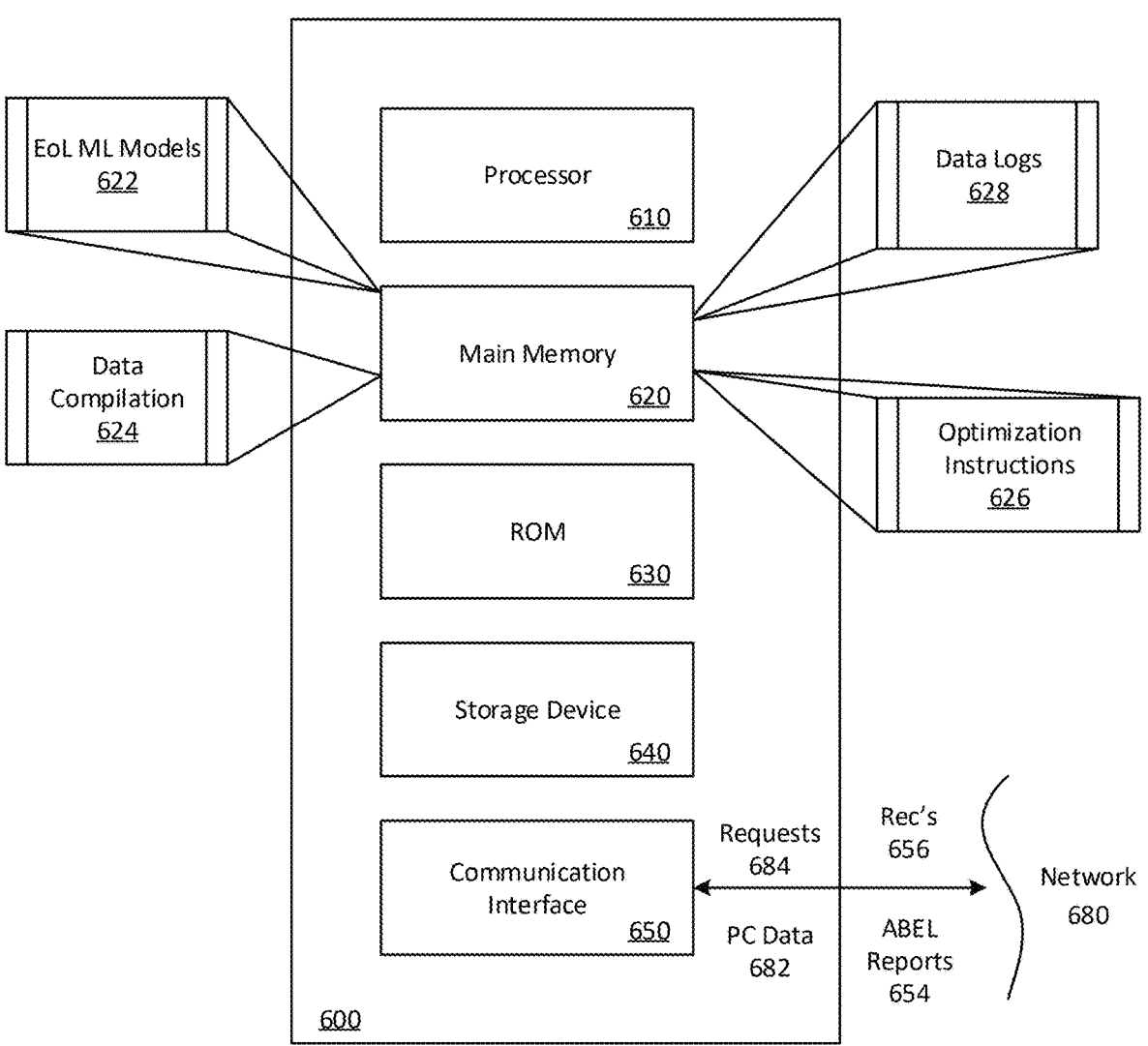
FIG. 6 is a block diagram that illustrates a computer system upon which examples described herein may be implemented.

FIG. 6 is a block diagram that illustrates a computer system upon which examples described herein may be implemented. A computer system 600 can be implemented on, for example, a server or combination of servers, virtual machine, cloud server(s), cloud environment or platforms. For example, the computer system 600 may be implemented as part of a network service, such as described in FIGS. 1 through 5B, and/or as a node in a distributed system of nodes (e.g., a distributed ledger 185). In the context of FIG. 1, the computing system 100 may be implemented using a computer system 600 such as described in connection with FIG. 6. The computing system 100 may also be implemented using a combination of multiple computer systems 600 as described in connection with FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random-access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate with one or more networks 680 (e.g., cellular network) through use of the network link (wireless or wired). Using the network link, the computer system 600 can communicate with one or more computing devices, one or more servers, one or more databases, and/or one or more self-driving vehicles. In accordance with examples, the computer system 600 receives requests from computing devices of individual users. The executable instructions stored in the memory 630 can include data compilation instructions 624, which the processing resources 610 can execute to connect, over the network(s) 680 with battery management systems, manufacturers, and other power cell data sources to receive power cell data 682 from individual power cells and power cell packages. Execution of the data compilation instructions 624 can cause the computer system 600 to generate data logs 628 for each power cell and organize the power cell data 682 therein.

The executable instructions stored in memory 620 can further include EoL machine learning models 622 executable by the processing resources 610 to determine ABELs for power cells based on the compiled power cell data in the data logs 682. Furthermore, the EoL machine learning models 622 can be executed by the processors 610 to receive data requests 684 from users over the network 680 and, in response, generate and transmit ABEL reports 654 to the requesting users over the network 680, as described herein. The executable instructions can further include battery optimization instructions 626, which the processor 610 can execute to monitor power cell data of battery-powered devices and provide usage optimization recommendations 656 and/or end-of-life recommendations to repurpose or recycle batteries, as described herein. It is contemplated that the instructions and data stored in the memory 620 can be executed by the processor 610 to implement the functions of an example computing system 100 of FIG. 1.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system comprising:

a network communication interface communicating, over one or more networks, with multiple power cell sources that include a plurality of power cells of different types;

one or more processors; and one or more memory resources storing instructions that, when executed by the one or more processors, cause the computing system to perform operations comprising:

receiving, over the one or more networks, from the multiple power cell sources, power cell data specific to each of the different types of power cells;

receiving context data for each of the different types of power cells, wherein for each of the different types of power cells, the context data indicates at least one condition under which one or more power cell sources of that type operate;

recording the received power cell data in one or more data logs;

executing one or more machine learning models to generate based, at least in part, on the power cell data specific to each of the different types of power cells of the multiple power cell sources, an approximate battery end of life (ABEL) determination for each of the multiple power cell sources; and receiving newly recorded power cell data as learning input for the one or more machine learning models, to improve an accuracy of the ABEL determination for at least one of the different types of power cells;

based at least in part on the newly recorded power cell data, executing the one or more machine learning models to update the ABEL determination for each of the multiple power cell sources; and for each of the multiple power cell sources, determining an optimal setting or operating condition for improving the ABEL determination, based on the context data received for the respective type of power cell.

2. The computing system of claim 1, wherein the operations further comprise:

confirming or adjusting one or more metrics used by the one or more machine learning models based on the newly recorded power cell data.

3. The computing system of claim 1, wherein the operations further comprise:

organizing the one or more data logs based on an identifier of each power cell of the plurality of power cells, and a timestamp indicating when power cell data for each power cell was received.

4. The computing system of claim 1, wherein the operations include:

receiving, via an interface, a data request that identifies a power cell of the plurality of power cells; and wherein the generated ABEL determination for the identified power cell uses power cell data recorded with the one or more data logs.

5. The computing system of claim 4, wherein the interface is provided via a website or as an application program interface.

6. The computing system of claim 1, wherein the multiple power cell sources include electric or hybrid vehicle batteries and battery-based home energy storage systems.

7. The computing system of claim 1, wherein the received power cell data is recorded on an immutable ledger.

8. The computing system of claim 1, wherein the operations include executing multiple machine learning models for different types of power cells.

9. The computing system of claim 8, wherein the operations include executing the one or more machine learning models for power cells that are second life power cells.

10. The computing system of claim 1, wherein the operations include determining, based on the ABEL determination, when a power cell of the plurality of power cells is at end of life, and transmitting, to a user, a recommendation for use of the power cell at end of life.

11. The computing system of claim 10, wherein the recommendation includes repurposing the power cell as a second life battery.

12. A non-transitory computer-readable medium that stores instructions, which when executed by one or more processors of a computing system, cause the computing system to perform operations that include:

receiving, over one or more networks, from multiple power cell sources of different types, power cell data specific to each of the different types of power cells;

receiving context data for each of the different types of power cells, wherein for each of the different types of power cells, the context data indicates at least one condition under which one or more power cell sources of that type operate;

recording the received power cell data in one or more data logs;

executing one or more machine learning models to generate based, at least in part, on the power cell data specific to each of the different types of power cells of the multiple power cell sources, an approximate battery end of life (ABEL) determination for each of the multiple power cell sources;

receiving newly recorded power cell data as learning input for the one or more machine learning models, to improve an accuracy of the ABEL determination for at least one of the different types of power cells;

based at least in part on the newly recorded power cell data, executing the one or more machine learning models to update the ABEL determination for each of the multiple power cell sources; and for each of the multiple power cell sources, determining an optimal setting or operating condition for improving the ABEL determination, based on the context data received for the respective type of power cell.

13. The non-transitory computer-readable medium of claim 12, wherein the operations further comprise:

confirming or adjusting one or more metrics used by the one or more machine learning models based on the newly recorded power cell data.

14. The non-transitory computer-readable medium of claim 12, wherein the operations further comprise:

organizing the one or more data logs based on an identifier of each power cell of the multiple power cell sources, and a timestamp indicating when power cell data for each power cell was received.

15. The non-transitory computer-readable medium of claim 12, wherein the operations include:

receiving, via an interface, a data request that identifies a power cell of the multiple power cell sources; and wherein the generated ABEL determination for the identified power cell uses power cell data recorded with the one or more data logs.

16. The non-transitory computer-readable medium of claim 15, wherein the interface is provided via a website or as an application program interface.

17. The non-transitory computer-readable medium of claim 12, wherein the multiple of power cell sources include electric or hybrid vehicle batteries and battery-based home energy storage systems.

18. The non-transitory computer-readable medium of claim 12, wherein the received power cell data is recorded on an immutable ledger.

19. The non-transitory computer-readable medium of claim 12, wherein the operations include executing multiple machine learning models for the different types of power cells.

20. A computer-implemented method comprising:

receiving, over one or more networks, from multiple power cell sources of different types, power cell data specific to each of the different types of power cells;

receiving context data for each of the different types of power cells, wherein for each of the different types of power cells, the context data indicates at least one condition under which one or more power cell sources of that type operate;

recording the received power cell data in one or more data logs;

executing one or more machine learning models to generate based, at least in part, on the power cell data specific to each of the different types of power cells of the multiple power cell sources, an approximate battery end of life (ABEL) determination for each of the multiple power cell sources;

receiving newly recorded power cell data as learning input for the one or more machine learning models, to improve an accuracy of the ABEL determination for at least one of the different types of power cells;

based at least in part on the newly recorded power cell data, executing the one or more machine learning models to update the ABEL determination for each of the multiple power cell sources; and for each of the multiple power cell sources, determining an optimal setting or operating condition for improving the ABEL determination, based on the context data received for the respective type of power cell.

* * * * *